United States Patent [19]

von Bogdandy et al.

[11] Patent Number: 4,566,904

[45] Date of Patent: Jan. 28, 1986

[54] PROCESS FOR THE PRODUCTION OF IRON

[75] Inventors: Ludwig von Bogdandy, Oberhausen-Sterkrade; Karl Brotzmann, Sulzbach-Rosenberg, both of Fed. Rep. of Germany

[73] Assignee: Klockner CRA Technologie GmbH, Duisburg, Fed. Rep. of Germany

[21] Appl. No.: 611,959

[22] Filed: May 18, 1984

[30] Foreign Application Priority Data

May 18, 1983 [DE] Fed. Rep. of Germany ....... 3318005

[51] Int. Cl.$^4$ .............................................. C21B 13/14
[52] U.S. Cl. ............................................ 75/38; 75/40
[58] Field of Search ...................................... 75/38, 40

[56] References Cited

U.S. PATENT DOCUMENTS

| | | | |
|---|---|---|---|
| 2,526,658 | 10/1950 | Harman et al. | 75/38 |
| 2,865,734 | 12/1958 | Klemantaski | 75/40 |
| 4,317,677 | 3/1982 | Weber et al. | 75/38 |
| 4,399,983 | 8/1983 | Metz | 266/176 |
| 4,448,402 | 5/1984 | Weber et al. | 75/38 |

FOREIGN PATENT DOCUMENTS 2755165 7/1979 Fed. Rep. of Germany .
3034539 3/1982 Fed. Rep. of Germany .

*Primary Examiner*—Melvyn J. Andrews
*Attorney, Agent, or Firm*—Watson, Cole, Grindle & Watson

[57] ABSTRACT

With the process for the production of iron from an iron-oxygen combination, preferably ore, the iron-oxygen combination is essentially reduced in an ore reduction vessel with a reaction gas from a melting crucible, then supplied to this melting crucible and melted by adding carbon-containing fuels and oxygen-containing gases.

According to the invention, the reaction gases escaping from the melted iron are partially subjected to afterburning in the melting crucible. The thus developing heat is largely transmitted to the melted material and the reaction gases are cooled and reduced with reducing agents on their way to the ore reduction vessel.

18 Claims, 1 Drawing Figure

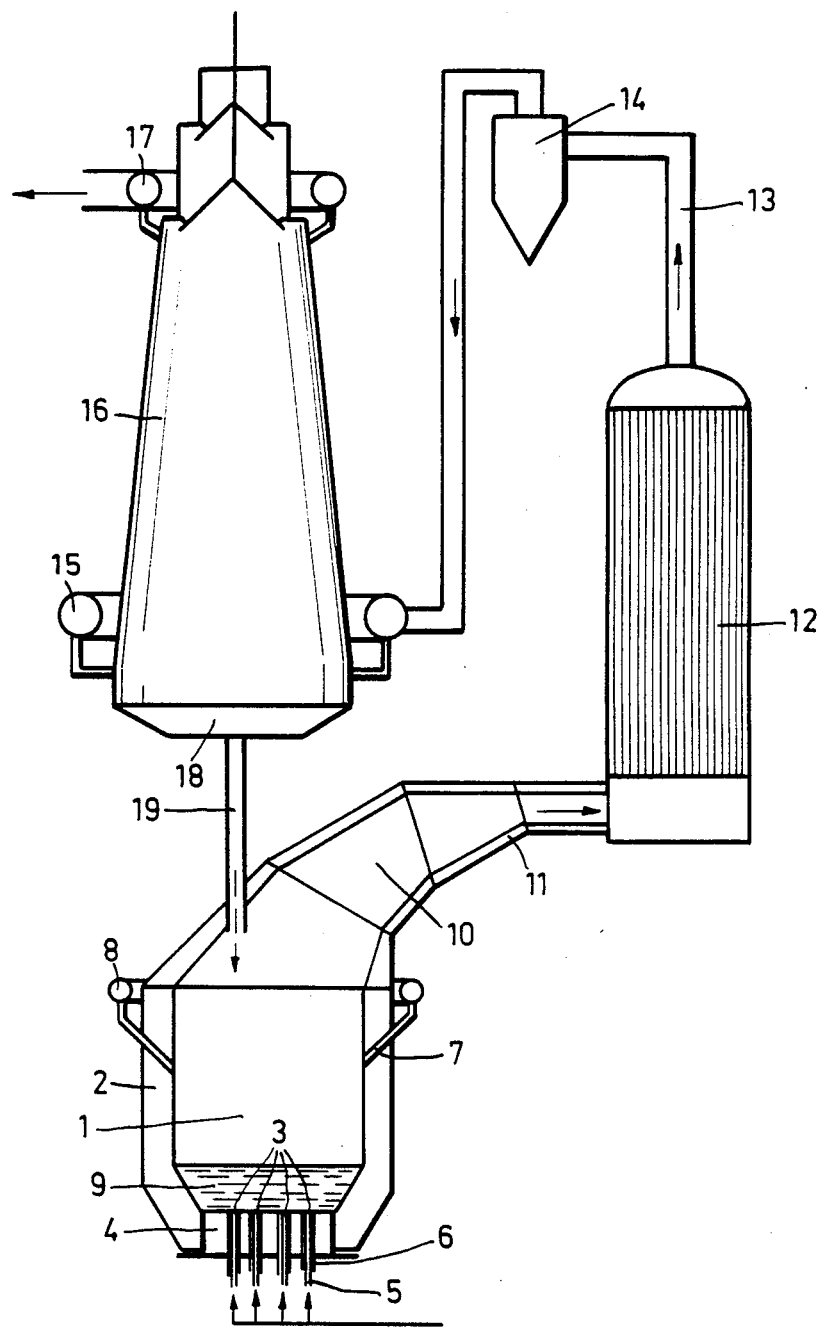

PROCESS FOR THE PRODUCTION OF IRON

The invention refers to a process for the production of iron from an iron-oxygen compound, preferably ore which is reduced in an ore reduction vessel essentially with the reaction gas from a melting crucible and is then supplied to the melting crucible and melted by adding carbon-containing fuels and oxygen-containing gases, for example, oxygen or air.

The state of the art comprises already processes to produce liquid crude iron directly from ore. The German Disclosure Publication No. 30 34 539 describes a process for the direct production of liquid crude iron from lump ore which is reduced to iron sponge in a direct reduction shaft furnace in the form of a loose charge by means of a hot reduction gas and is then supplied in hot condition to a melting gasifier through a discharge device. The heat required for the melting of the iron sponge is supplied to this vessel by means of coal and oxygen-containing gas and the reduction gas is produced there.

Additional processes which have become known recently and which differ essentially from each other by the features of devices, for example, the COIN process, the KR process and the Kawasaki Steel Process, operate in accordance with a similar principle. The economic disadvantages of these processes lie mainly in the fact that high quality fuels, such as, for example, low-ash anthracite or a special carbonized lignite, must be used so that sufficient energy is supplied to the melting crucible in order to melt the iron obtained in the reduction process. However, even under these conditions, a high coal rate is necessary and the developing reaction gas exceeds considerably the amount of gas required for the ore reduction process. It is, therefore, of importance for the economic application of the mentioned processes that the excess gas can be utilized in a meaningful manner. However, frequently, this condition cannot be met.

The task of the present invention is to create a process which makes it possible to use coal with a lower energy or coal with a high portion of volatile components and to maintain the resulting amount of reaction gas approximately in the order of magnitude as it is required for the ore reduction within the framework of the overall process.

This task is accomplished with the process according to the present invention in that the reaction gas escaping from the melted iron are partially subjected to afterburning in the melting crucible whereby the thus developing heat is largely transferred to the melted iron and the reaction gases are cooled and reduced on their way to the ore reduction vessel with the help of reducing agents.

In accordance with the present invention, additional energy from the afterburning of the waste gases is transferred in the known manner in the melting crucible to the iron bath as it is described, for example, in the German Disclosure Publication No. 27 55 165. Before being introduced into the ore reduction vessel, the reaction gases are cooled and simultaneously reduced by adding reducing agents so that they have a more favorable composition for the reduction process. In accordance with the process of the invention, for example, a more favorably priced long-flame gas coal can be used in the melting crucible having the following composition: C 73.1%, H 4%, $O_2$ 11.1%, $N_2$ 1.5%, ash 8.5%, volatile components 27%, moisture 1.5%, heating value Hu 6700 kcal. Without the afterburning of the reaction gases, this coal would practically not transmit any energy to the iron bath during the gasification.

In accordance with the invention, oxygen or preheated air is blown into the gas chamber of the melting crucible. The amount of oxygen blown on the melted material can be optionally varied between about 10% and 90%, depending on the desired degree of afterburning. In this way, using this example, the afterburning of 15% of the CO components is achieved with the blowing of 30% oxygen. The compositions of the reaction gases are:

(a) without afterburning CO 68%, $H_2$ 27%, $N_2$ 5%;
(b) with afterburning CO 57%, $CO_2$ 10%, $H_2$ 16%, $H_2O$ 12%, $N_2$ 5%.

The energy additionally obtained from the afterburning is almost completely transferred to the iron bath.

By adding 8% by volume natural gas relative to the amount of reaction gas, the gas temperature is reduced from 1575° C. to 900° C. and, at the same time, the degree of oxidation decreases from 23% to 12%. The gas composition, after having added this reduction gas, amounts then to: CO 54%, $CO_2$ 6%, $H_2$ 30%, $H_2O$ 5%, $N_2$ 4%.

The reduction of the reaction gases can be effected also by blowing-in pulverized coal. In accordance with the example, 74 kg coal are blown in per 1000 $m^3$ reduction gas. This, again, reduces the gas temperature from 1575° C. to 900° C. The degree of oxidation of the gas is simultaneously decreased by 15% and the gas consists then of CO 66%, $CO_2$ 5%, $H_2$ 22%, $H_2O$ 2%, $N_2$ 5%. This gas composition is optimally suitable for the ore reduction in the reduction vessel.

Instead of oxygen, also preheated air, if necessary enriched with oxygen, can be blown into the melting crucible. With a hot wind temperature of approximately 1200° C., the same thermal efficiency is reached in the melting crucible as with the use of pure oxygen. If lower hot wind temperatures are to be applied, a certain enrichment of the air by oxygen may be expedient.

One advantage of this alternative of the process is that the amount of heat is higher in the waste gas in comparison with the use of oxygen which permits adding greater quantities of natural gas or coal whereby the contents of $CO_2$ and $H_2O$ remaining in the waste gas are further reduced. Therefore, the composition is more favorable for the subsequent ore reduction with this alternative of the process.

An especially economical form of this alternative of the process consists of optimizing the use of coal and the afterburning in the melting crucible in such a way that exactly that degree of metallization is reached during the ore reduction at which the energy balance is equalized in the melting crucible. For example, 530 kg coal with the aforementioned composition are required for the melting of iron sponge with a degree of reduction of 75% with hot charging for the melting crucible in order to produce one ton of raw steel.

The afterburning in the melting crucible is effected by blowing hot wind with a temperature of 1200° C. Thus, a reduction gas develops in the melting crucible with a degree of oxidation of 23% relative to the CO and $H_2$ components. By adding 120 kg pulverized coal to the reaction gas as a reducing agent, the degree of oxidation of the gas is reduced to about 2%. The gas cools then down to 900° C. as already described in the example using oxygen as the medium which is blown in.

The amount of gas is sufficient for a 75% metallization of the ore in the reduction vessel, for example, a shaft furnace.

The economical advantage of this alternative of the invention consists of the fact that high amounts of energy are transmitted in the melting crucible, the gas reaches an optical composition for the ore reduction by adding reducing agents and no expensive return of the gases for which a $CO_2$ removal and reheating would be necessary, need be carried out for the ore reduction process in the reduction vessel.

According to the invention, the adding of the reducing agents and the cooling of the reaction gases connected with it can be performed in a special vessel. This conditioning vessel which is arranged in the gas flow between the melting reactor and the ore reduction vessel is advantageously designed in such a way that as intimately a mixing as possible is effected between the reaction gases and the reducing agent. Expediently, the conditioning vessel may have as high a thermal capacity as possible, for example, similar to that of a hot air stove, so that a largely constant temperature of the gases is achieved for the reduction process.

In accordance with another feature of the invention, it may be advantageous to introduce the reaction gas directly into the ore reduction vessel after the reduction and a coarse dust cleaning have been effected, for example, in a hot cyclone, with a temperature of approximately 900° C. The known reduction processes can be applied, such as, for example, the shaft furnace, the gas reduction of fine ore, in a circulating fluidized layer or in a fluidized bed process. It is also within the scope of the invention to treat the waste gas from the ore reduction vessel in the known manner and to resupply it to the reduction process.

The present invention permits also the application of a metallurgical process which avoids a special disadvantage of the processes within the state of the art, i.e., high contents of sulfur in the liquid iron. In the case of the present processes, almost all sulfur can be found in the melted iron. The sulfur content amounts then to about 0.5-1% and, thus, expensive processes become necessary for the desulfurization. The variable and high transmission of energy, particularly from the reaction gas afterburning in the melting crucible, permits maintaining the bath temperature at about 1550° C. with the process according to the invention and, furthermore, adding higher amounts of lime as slag-forming constituent in order to achieve a slag basicity of about 2. Deviating from the usual conditions comprising the adding of approximately 80 kg per ton of coal, the lime rate must be increased to about 200 kg. Surprisingly, sulfur distribution numbers are achieved with the metallurgical process according to the invention between slag and bath of about 100 and the sulfur contents are then about 0.015% in the liquid iron.

The mentioned slag leads, moreover, to a sizeable dephosphorization and a liquid iron can be produced with the process according to the invention having the approximate composition of steel. This base melted material can then be subjected to an aftertreatment with the known modern processes of secondary metallurgy in the tap ladle for the desired steel analysis.

The process according to the invention is economically particularly interesting in connection with ore reduction processes in which fine ore is used, such as, for example, in the fluidized bed process, with which, however, no high degrees of metallization can be achieved by the gas reduction as has been shown in practice. In general, these processes can be best operated with a degree of metallization of the reduced ore of 70 to 80%. This partially reduced material requires then considerable additional energy during the melting for the remaining reduction work. Approximately twice the amount of heat is then required in comparison with the melting of pure iron. With the process according to the invention, this increased requirement of energy can be introduced in the melting crucible, preferably by a higher degree of afterburning of the reaction gases, up to the upper limit, i.e., relative to $CO_2$, of about 15 to 20%.

A special advantage of the process according to the invention consists of the coupling of the melting crucible with the ore reduction vessel, for example, a shaft furnace. The amounts of reaction gas from the melting crucible are adjusted, in this instance, to the reduction requirement in the ore reduction vessel. With the supply of reducing agents, for example, natural gas or coal dust, to the reaction gases from the melting crucible, it becomes possible to transform sensible heat into chemical heat in a targeted manner and to increase the reduction potential of the reaction gases and, at the same time, to reduce the temperature to optimum values for the ore reduction process.

With this compound system, i.e., the direct connection of the melting crucible to the ore reduction vessel, if necessary, by connecting in between a conditioning vessel and hot cyclone dust collector, an additional particularly advantageous application of the process according to the invention consists of operating the melting crucible with excess pressure to the range from approximately 1.5 to 5 bar. The set excess pressure is to be expediently of such a dimension that it is above the overall pressure losses of the reaction gases on their way from the melting crucible through the interconnected devices to the gas outlet at the ore reduction vessel. By using this process, relatively expensive systems can be eliminated for the compressing of the gases for the ore reduction process.

It is, furthermore, within the scope of the invention to reduce and cool the reaction gases from the melting crucible directly above it by adding the reducing agents, for example, natural gas or coal dust, so that the metal and slag particles carried along by the gas flow cool below their point of solidification and, thus, do not lead to deposits in the reaction gas line. If, on the other hand, such spattered particles and coarse dust particles are thrown against the wall of the reaction gas line in their non-solid condition, they can lead there to interfering deposits resulting then in undesirable cross-sectional narrowing of the gas line which requires comprehensive repair and cleaning work.

The invention is now further explained with the help of a drawing and non-restrictive examples.

The drawing shows, as an example, a diagram of the compound system of the melting crucible and, subsequently in the direction of the gas flow, the conditioning vessel, hot cyclone and ore reduction vessel.

A melting crucible (1) with a refractory lining (2) has an inside volume of 150 m$^3$ after its fresh lining. The nozzles (3) in the bottom (4) of the crucible consist of two concentric tubes whereby the inner diameter of the inner tube (5) amounts to 24 mm and the ring slot width to 1 mm between the two tubes. Oxygen or ground coal flows with a carrier gas into the melted material through the central tube (5) of the bottom nozzles (3). A switch-over can take place from oxygen to the carbon carrier gas suspension with valves according to the German Patent Application No. 29 49 801. In order to protect the nozzles (3), the gaseous and/or liquid hydrocarbons, in this case propane, are led through the ring slot (6) in an amount of approximately 2.5% by volume relative to the oxygen.

Two oxygen blast jet nozzles (7) which penetrates the refractory lining (2) and which are supplied through the collective line (8) are arranged in the upper gas chamber of the melting crucible (1). The outlet openings of the nozzles (7) are approximately 3.5 m above the calm surface of the bath and have an inner diameter of 40 mm.

The melted iron (9) is in the melting crucible (1) and has a weight of 120 tons and a temperature of 1500°–1600° C. Approximately 70 tons of crude steel are produced per hour in the melting crucible using the supplied materials as described below for the process compound system.

During operation, 40 tons of coal/h flow through the 6 bottom nozzles and have a composition of C 73%, $H_2$ 4%, $O_2$ 11%, $N_2$ 1.5%, ash 8.5%, volatile components 27%, moisture 1.5%, heating value Hu 6700 kcal/kg. Approximately 12,000 $Nm^3$/h oxygen are supplied in parallel to the bath through 8 additional bottom nozzles.

For the slag formation, the oxygen is charged with lime dust (CaO) in an amount of approximately 12 tons/h. The charging can be effected continuously or only intermittently but then, of course, with a correspondingly higher charging rate.

The blast jet nozzles (7) whose direction of blast is approximately towards the center of the bath are operated with an oxygen blast rate of approximately 15,000 $Nm^3$/h. The gas jets which act as free jets over a sufficiently long distance in the gas chamber of the melting crucible draw in several times the quantity of the introduced oxygen volume of the reaction gases in the gas chamber and, thus, the afterburning of approximately 15% CO into $CO_2$ or the overall afterburning of 23% (including the portion of $H_2$ into $H_2O$) is achieved. The heat thus released is largely transmitted to the melted material by means of this special blast technique and in combination with the strong motion of the bath owing to the introduction of a portion of the overall oxygen through the bottom nozzles.

Approximately 80,000 $Nm^3$/h reaction gas, having the composition CO 57%, $CO_2$ 10%, $H_2$ 16%, $H_2O$ 12%, $N_2$ 5%, heating value Hu approximately 1860 kcal/$Nm^3$, escape from the melting crucible through the gas line (10) having a refractory lining (11). In the hot-blast-stove-like conditioning vessel (12), which has a high thermal capacity owing to its lattice structure, approximately 5000 kg/h coal dust are mixed with this reaction gas. The special lattice-like masonry with an additional gas routing diagonally to the main flow direction leads to an intensive mixing of the reaction and coal dust and, thus the reaction gas is reduced and, at the same time, cooled. The gas with a composition of approximately CO 55%, $CO_2$ 6%, $H_2$ 31%, $H_2O$ 5%, $N_2$ 4% leaves the conditioning vessel (12) through the gas line (13) with an optimal temperature of approximately 900° C. for the ore reduction.

The reduced reaction gas flows through a hot cyclone (14) in which carried-along dust particles are separated. Then, it enters the ore reduction vessel (16), a shaft furnace (16), through the closed-circuit pipe line (15) and jet nozzles, similar as in the case of a blast furnace. Approximately 110 tons iron ore with Fe content of approximately 64% are reduced per hour in the ore reduction vessel (16). After the reduction work is finished, a gas having a composition of approximately CO 41%, $CO_2$ 30%, $H_2$ 23%, $H_2O$ 1%, $N_2$ 4% leaves the shaft furnace (16) and is discharged through the collective line (17).

The reduced ore is led with a degree of metallization of 75% and a temperature of approximately 800° C. directly into the melting crucible from the ore reduction vessel (16) through the discharge device (18) and the down pipe (19).

The amount of gas of approximately 90,000 $Nm^3$/h on the shaft furnace (16) can be supplied to any consumers, for example, for heating purposes. However, it is also within the scope of the invention to treat the gas by means of $CO_2$ scrubbing and to return it then again to the ore reduction vessel as reduction gas.

About 650 kg coal of the mentioned composition, 380 $Nm^3$ oxygen and 165 kg CaO are used per produced ton of raw steel (an iron with approximately 2 to 3% carbon and slight contents of phosphorous and sulfur) with the described compound system of melting crucible with partial afterburning of the reaction gases, their subsequent reduction with simultaneous cooling and the preliminary reduction of iron ore.

The raw steel can be withdrawn on an hourly basis in lots or continuously through a corresponding taphole from the melting crucible. There is a pressure of 2 bar in the melting crucible (1) when the process is carried out according to the invention using these examples. This pressure is sufficient to overcome the flow resistance in the overall system and devices can be eliminated for the reduction gas compressing.

In the case of another application of the process according to the invention, a hot wind, i.e., air preheated to approximately 1200° C., is blown in the melting crucible, instead of oxygen, through the nozzles (7) in the upper portion of the crucible on the bath surface. The process is carried in the same systems as shown schematically in FIG. 1. Coal and oxygen flow, at least partially charged with lime, into the melted iron through the bottom nozzles (3) in the melting crucible (1). The amount of CaO for slag formation is adjusted in such a fashion that a slag basicity ($CaO/SiO_2$) of about 2 is obtained from the lime and $SiO_2$ content of the coal ash and the dross of the ore. This slag basicity leads, with a temperature of approximately 1550° C. of the melted iron, to a sulfur distribution number between slag and bath of about 100, i.e., the sulfur content amounts to approximately 0.015% in the liquid iron while the sulfur concentration is at about 1.5% in the slag.

Exclusively hot wind is blown on the melted material, on the surface of the bath, through the lateral nozzles (7) in the upper portion of the crucible which are arranged about 3 to 4 m above the calm surface of the bath. In this way, a degree of afterburning is reached of, overall, 23.4% (15% CO to $CO_2$, remainder $H_2$ to $H_2O$).

With the analogous performance of the process as in the first example, the following values of materials used and gas compositions have been obtained for the production of 1 ton of raw steel: 640 kg coal (including for the gas reduction) of the mentioned composition, 130 $Nm^3$ oxygen, 1250 $Nm^3$ hot wind with 1200° C. preheating temperature, 155 kg lime for the slag formation, 1560 kg ore which, after a partial reduction with a degree of metallization of 75%, is directly supplied to the melting crucible from the ore reduction vessel with a temperature of approximately 800° C.

Approximately 1750 Nm³ reaction gas develops with a temperature of approximately 1575° C. in the melting crucible and a composition of CO 36%, $CO_2$ 6%, $H_2$ 10%, $H_2O$ 7.3%, $N_2$ 41%. After 110 kg coal dust has been mixed in, one obtains approximately 2000 Nm³ reduced reaction gas with a temperature of 900° C. and a composition of CO 38%, $CO_2$ 2%, $H_2$ 25%, $H_2O$ 2%, $N_2$ 33%. This reduction gas serves the purpose of the desired ore reduction in the ore reduction vessel and leaves the shaft furnace with a composition of CO 28%, $CO_2$ 16%, $H_2$ 18%, $H_2O$ 2%, $N_2$ 36%. The amount of waste gas comes to approximately 1875 Nm³ and has a heating value Hu of approximately 1300 kcal/m³.

About 2000 Nm³/ton raw steel are necessary for the performance of the process according to the invention with the exclusive application of hot wind with a preheating temperature of 1200° C. The specific coal consumption does not change.

According to the invention, the materials used, the reducing agents, the degree of afterburning and also the process of the ore reduction in the ore reduction vessel can be varied with the development of an equalized energy balance. As long as the partial afterburning of the reaction gases in the melting crucible and the reduction with the simultaneous cooling of the reaction gases are applied, modification of the process development in the described compound system are within the framework of the process according to the invention as from the at least partially performed ore reduction in the ore reduction vessel with the subsequent melting in the melting crucible.

A particularly advantageous design of the process according to the invention, as regards its economy, consists of using the pre-reduced ore with a degree of metallization of 30 to 70%, preferably approximately 50%, from the ore reduction vessel in the melting crucible and to increase, at the same time, the afterburning of the reaction gases in the melting crucible to 30 to 40%.

In accordance with this alternative of the invention, the gas utilization in the ore reduction vessel can be surprisingly increased in practice up to the order of magnitude of 50% when the metallization of the pre-reduced ore is reduced below the known degree of metallization of approximately 75% which is already considered as being low. For example, a gas utilization in the furnace shaft of 45% can be achieved with the process according to the invention at a degree of metallization of 53%.

The use of the pre-reduced materials, for example, prereduced high-quality ore with a metallization degree of 30 to 70%, preferably approximately 50%, can be carried out in the melting crucible without causing any problems with the process according to the invention as long as one works with the high afterburning of 30 to 40% of the reaction gases in the melting crucible. According to the invention, the oxygen blast rate is considerably increased for this purpose and can amount to a maximum of 100%. The oxygen-containing blast gases can be blown on the bath through a lance and/or nozzles installed in the refractory material in the upper area of the melting crucible in such a way that gas jets develop into free jets over a sufficiently long distance in the gas chamber of the melting crucible. Then, the free jets draw in many times the blown-in gas volume. The utilized oxygen-containing gases may be, for example, pure oxygen, air or any mixture of air and oxygen.

Surprisingly, when the process according to the invention was performed with a high afterburning of 30 to 40%, it has been demonstrated that an increase in the blowing rate of the oxidizing gases, up to the exclusive blowing of, for example, preheated air, has a favorable influence on the reliable setting of the relatively high afterburning. In all probability, this surprising effect is due to a decrease in the bath motion. It is within the scope of the invention to supply also the other reaction partners, for example, the coal, in part to the method iron by blowing.

An essential feature of the invention consists of the use of preheated air as an oxidation agent. The higher amount of physical heat, owing to the relatively larger ballast gas volume in the form of nitrogen, permits adding larger quantities of reducing agents to the reaction gas from the melting crucible while, simultaneously, maintaining a favorable temperature of 800° to 1000° C. Thus, it is possible with the process according to the invention to permit, on the one hand, increased degrees of afterburning in the melting crucible and, on the other hand, to make available an optimal reduction gas for the ore reduction vessel.

According to the invention, this process permits structuring the overall process in a largely autothermal manner, i.e., only a slight excess in energy develops. The waste gases from the ore reduction vessel have only a residual heating value of 600 to 1000 kcal/Nm³. For example, it was possible to reduce the amount of waste gas from the ore reduction vessel to approximately 1900 Nm³ with a residual heating value of approximately 750 kcal/Nm³.

In order to produce 1 ton raw steel from ore, one requires only 500 to 600 kg of a low-priced coal with a high portion of volatile components. Approximately 350 kg of this coal are blown into the melting crucible and, in order to reduce the reaction gases escaping from the melting crucible with a high degree of afterburning, the remaining quantity of coal of approximately 150 kg is added in pulverized form to the reduction of the reaction gases on their way to the ore reduction vessel. This portion of the coal for the gas reduction can be replaced by other reducing agents, for example, natural gas.

According to the invention, the reaction gases cool down during the reducing process from approximately 1600° C. when leaving the melting crucible to the optimum temperature of 800° to 1000° C. for the reduction in the ore reduction vessel.

For example, there is melted iron in a converter-like melting crucible in which 360 kg coal with 34% volatile components, 7% ash and 1.5% moisture are blown through nozzles arranged below the surface of the bath for the production of 1 ton raw steel. At the same time, one blows 1270 Nm³ air with a preheating temperature of 1200° C. on the surface of the bath of the melted iron. Furthermore, 1200 kg pre-reduced ore are introduced into the melting crucible with a temperature of 800° C. and a degree of metallization of 59%. The given quantities refer in this case and below always to the production of 1 ton raw steel.

1710 Nm³ gas escape from the melting crucible with a temperature of 1575° C. and a composition of CO 19%, $CO_2$ 8%, $H_2$ 5%, $H_2O$ 8.5%, $N_2$ 59.5%. This gas is reduced on its path to the reduction vessel in a shaft furnace using 146 kg coal and it has then a composition of 31% CO, 1.6% $CO_2$, 14% $H_2$, 1.7% $H_2O$, 49.6% $N_2$ and a temperature of approximately 1000° C. The gas volume has increased to approximately 2060 Nm³ by adding the reduction coal.

Instead of the 146 kg coal, also 120 Nm³ natural gas can be used for the reduction of the reaction gases coming from the melting crucible.

The waste gas leaving the shaft furnace is wet cleaned and has then a composition of approximately 18%, CO, 17% $CO_2$, 10% $H_2$, 2% $H_2O$, 53% $N_2$. The heating value amounts to approximately 790 kcal/Nm³. Approximately 750 Nm³ of this gas are used for the preheating of the air.

The total excess of gas amounts to only approximately 1100 Nm³ corresponding to about 0.9 Gcal.

This alternative process according to the invention has, thus, considerable economic advantages in comparison with the known processes. The described system, for example, the ore reduction vessel, can be replaced by other known reduction processes, such as, for example, a fluidized bed, circulating fluidized layer. A variation is also possible with regard to the supply of reducing agents to the reaction gas from the melting crucible. For example, instead of the direct feeding of reducing agents into the pipe line, special vessels through which the flow passes, for example, with an improved mixing effect, can be utilized. In addition, the carbon-containing fuel can in part be added to the melting crucible from above the surface of the iron melt therein.

We claim:

1. A process for producing iron from a compound containing iron and oxygen, said process comprising the steps of
   (1) introducing a compound containing iron and oxygen into a reduction vessel,
   (2) adding a cooled reduction gas to said reduction vessel to partially reduce said compound therein,
   (3) transferring said partially-reduced compound obtained in step (2) from said reduction vessel to a melting crucible,
   (4) adding a carbon-containing fuel and at least one oxygen-containing gas to said melting crucible,
   (5) completely reducing and melting said partially-reduced compound in said melting crucible to form an iron melt,
   (6) producing a reaction gas in said melting crucible,
   (7) partially afterburning said reaction gas to obtain an after-burned gas and to generate heat,
   (8) transferring said heat generated in step (7) to said iron melt,
   (9) reducing and cooling said after-burned gas obtained in step (7) with a reducing agent to obtain the cooled reduction gas used in step (2), and
   (10) removing portions of the iron melt from said melting crucible.

2. The process according to claim 1, wherein in step (4) said carbon-containing fuel is added to said melting crucible below the surface of the iron melt therein.

3. The process according to claim 1, wherein in step (4) said carbon-containing fuel is added to said melting crucible above the surface of the iron melt therein.

4. The process according to claim 1, wherein a first oxygen-containing gas is added to said melting crucible below the surface of the iron melt therein.

5. The process according to claim 4, wherein a second oxygen-containing gas is added to said melting crucible above the surface of the iron melt therein.

6. The process according to claim 5, wherein said first and second oxygen-containing gases are selected from the group consisting of oxygen, heated air and mixtures thereof.

7. The process according to claim 5, wherein about 10% to 90% of the total amount of oxygen added to said melting crucible is supplied by said second oxygen-containing gas.

8. The process according to claim 1, wherein between steps (8) and (9) said after-burned gas is conveyed to a conditioning vessel.

9. The process according to claim 8, wherein step (9) is accomplished by adding powdered coal to said after-burned gas in said conditioning vessel.

10. The process according to claim 8, wherein step (9) is accomplished by adding natural gas to said after-burned gas in said conditioning vessel.

11. The process according to claim 1, wherein in step (4) a slag-forming agent is also added to said melting crucible.

12. The process according to claim 11, wherein said slag-forming agent comprises lime.

13. The process according to claim 12, wherein sufficient lime is added to said melting crucible to provide a slag basicity of about 2.

14. The process according to claim 1, wherein said reduction vessel is a shaft furnace.

15. The process according to claim 1, wherein said reduction vessel is a fluidized bed reactor.

16. The process according to claim 1, wherein in step (7) the reaction gas is afterburned to a degree of 30% to 40%.

17. The process according to claim 1, wherein in step (2) said compound is partially reduced to a degree of metallization of between 30 and 20%.

18. The process according to claim 1, wherein the pressure in said melting crucible is maintained at 1.5 to 5 bar.

* * * * *